Dec. 24, 1968  J. T. DEAN ET AL  3,417,611
SYSTEM FOR DETERMINING DRILL-PIPE TORQUE
Filed Sept. 22, 1966

JAMES T. DEAN
WILTON GRAVLEY
LUTHER W. RANDERSON
WARREN B. BROOKS
INVENTORS

BY *William R. ...*
ATTORNEY

United States Patent Office 3,417,611
Patented Dec. 24, 1968

3,417,611
SYSTEM FOR DETERMINING DRILL-PIPE
TORQUE
James T. Dean, Dallas, Wilton Gravley, Carrollton, Luther W. Randerson, Midland, and Warren B. Brooks, Dallas, Tex., assignors to Mobil Oil Corporation, a corporation of New York
Filed Sept. 22, 1966, Ser. No. 581,215
7 Claims. (Cl. 73—136)

ABSTRACT OF THE DISCLOSURE

A rotary drilling system adapted to measure torque applied to the drill pipe. In the system, either the rotary table housing or the prime mover is rigidly connected to a base by means of locking means which include as a part thereof a load-sensing means, e.g., strain gauge. A force reaction which is responsive to the torque on the drill pipe will be imposed on the rotary table housing or the prime mover and will be sensed by the strain gauge in the locking means.

---

This invention relates to rotary drilling systems and, more particularly, to rotary drilling systems adapted for the measurement of drill-pipe torque.

In the rotary drilling of a well it often is desirable to measure the torque imparted to the drill string in order to obtain information regarding the drilling operation. Such torque commonly termed "drill-pipe torque" is indicative of many factors, such as bit wear, the weight on the bit, and the hardness of the formation. Numerous techniques have been devised for the measurement of drill-pipe torque. In the so-called chain-drive systems in which the rotary table is driven by a central prime-mover unit through a drive chain, chain-actuated torque gauges such as that disclosed by Decker et al., "What's New In Drilling Instruments," Oil and Gas Journal, pp. 80–82, Nov. 29, 1954, have proven relatively accurate and easily adaptable to field installation on existing units.

However, in rotary drilling systems comprising a shaft-driven rotary table in which the drive shaft is connected to an independent prime mover, there have not heretofore been available accurate torque measuring units which are easily adaptable to field use. Numerous systems have been devised for measuring drill-pipe torque in shaft-driven rotary systems. One such system, in which a torque gauge is interposed in a drive shaft, is disclosed in the aforementioned article by Decker et al. While this system is suitable in some instances, it is not easily adapted for field installation in already existing units. Other means of measuring torque in shaft-driven units have been proposed. For example, torque gauges of such units may take the form of manifold-pressure gauges in those cases in which the prime mover is an internal combustion engine. While such torque gauges are easily installed they leave much to be desired from the standpoint of accuracy. It has also been proposed to measure the torque directly through the use of load-sensing means, such as strain gauges, installed on the drive shaft or on the drill string itself. While such installations provide for accurate torque measurements, they involve the utilization of slip-ring type connections and, thus, do not possess the rugged characteristics desired in field installations.

In accordance with the present invention, there is provided a system for measuring drill-pipe torque which is rugged and highly accurate and yet is readily adapted for field installation on existing systems. The system of the present invention is particularly well adapted for field installation on the so-called independent drive units in which the rotary table is driven directly from the shaft of a prime mover, such as an internal combustion engine.

In the present invention, a support means which is coupled to a drive shaft in a load-bearing relationship for rotation relative thereto is connected to a base means, such as the derrick floor. The support means may be any suitable structure on which a force reaction responsive to the torque developed in the drill pipe is imposed by means of the rotational load-bearing relationship of such structure with the drive shaft. Preferably, the support means takes the form of the rotary-table housing or the prime mover as described in detail hereinafter. One or more stress elements interconnected between the support means and the base is provided with a load-sensing means such as a strain gauge for generating a function representative of a change in the force exerted on such stress element induced by a change in the drill-pipe torque. Preferably the stress elements take the form of the locking elements which rigidly secure the support means to the base means. However, such a stress element may be of any suitable structure interconnected between the support means and the base in which stress is induced by a change in drill-pipe torque as described hereinafter. Display means responsive to the function generated is provided in order to present a representative characteristic of this function and, therefore, of the torque developed in the drill-pipe.

For a better understanding of the invention, reference may be had to the following detailed description taken in conjunction with the drawings in which.

Figure 1:
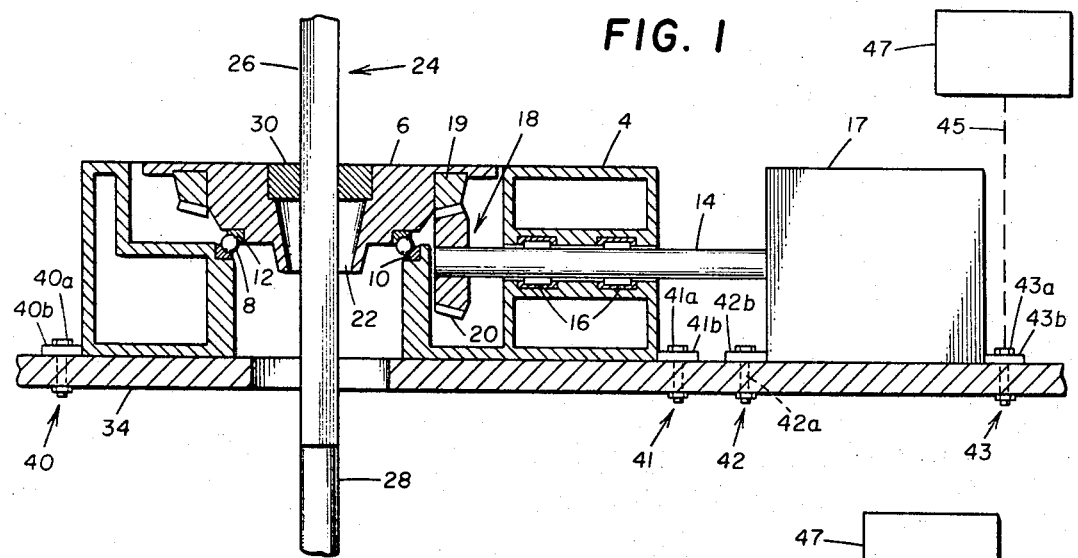
FIGURE 1 is an illustration, partly in section, showing one embodiment of the invention.

With reference to FIGURE 1, there is shown an independent-drive rotary unit adapted for the measurement of drill-pipe torque. The unit comprises a rotary-table housing 4 and a rotary table 6 journalled in the housing for rotational movement about a longitudinal (normally vertical) axis. The rotary table 6 may be journalled within the housing 4 by any suitable means. For example, as shown in the drawing, the rotary table may be supported on ball bearings 8 mounted in bearing races 10 and 12 of the housing 4 and table 6, respectively. A drive shaft 14 is journalled in the housing as by means of roller bearings 16 and extends laterally through the housing to a prime mover 17. Prime mover 17 may be of any suitable type. For example, the prime mover may take the form of a D.C. motor or a gasoline engine, including the necessary clutch and transmission mechanisms. The drive shaft and the rotary table are interconnected by a suitable bidirectional transmission 18. As shown in the drawing, this transmission may take the form of a bevel ring gear 19 secured to the rotary table and a drive gear such as bevel gear 20 which is keyed or otherwise suitably secured to the drive shaft 14.

The rotary table is provided with a longitudinal opening 22 therein which is adapted to receive a drill string 24. The drill string 24 comprises a kelly 26 which is secured to the draw works (not shown) of the drilling rig and one or more stands of drill pipe 28. A rotary drill bit (not shown) is attached to the bottom of the drill string. The kelly which is polygonal, e.g., hexagonal or square, in cross-section is received within the opening 22 in a slidable, torque-applying relationship through means of a kelly bushing 30.

The rotary-table housing 4 and the prime mover 17 are supported on a suitable base structure 34 which forms a stable foundation for these components. For example, as will be understood by those skilled in the art, the base structure may take the form of a derrick floor which is mounted on piers or other suitable foundation elements. The base structure may, of course, take other forms. For example, it may comprise the deck of an offshore drilling platform.

During drilling operations, the prime mover 17 rotates the drive shaft 14 which, in turn, imparts rotational movement to the rotary table 6 through the action of the transmission 18. The rotary table through its engagement with the kelly 26 turns the drill string thus imparting torque thereto. As the well bore is drilled into the formation, there occurs a resistance to the induced torque in the drill string and a force reaction is fed back through the drill string to the gear 19 and hence to the drive gear 20 and drive shaft 14. Force components of this reaction are transferred through the shaft 14 to the prime mover 17 and also to the rotary-table housing 4, thus, tending to rotate the prime mover and the rotary-table housing in a direction opposite the direction of rotation of the rotary table. In addition, the torque in drive shaft 14 will tend to impart a counter-rotational force to prime mover 17. By way of an exemplary illustration of these relationships, if shaft 14 rotates in a clockwise direction, as viewed from the gear end of the shaft, the torque imparted by the resistance of the drill pipe to rotation will produce a force reaction tending to rotate housing 4 and prime mover 17 in a counterclockwise direction, as viewed from the top of the drilling rig. In addition, a rotational force will be imparted to the prime mover 17 opposite in direction to the rotational movement of the drive shaft 14. Thus, as shaft 14 rotates in a clockwise direction, the prime mover will tend to rotate in a counterclockwise direction as viewed from the gear end of the shaft 14.

The rotary-table housing and prime mover may be rigidly connected to the base support by suitable locking elements such that movement of these components under the influence of the above-described forces is prevented. In accordance with the present invention, the force on one or more of these locking elements is utilized to advantage by providing at least one of the locking elements with load-sensing means such as a strain gauge. Changes in the force on this locking element, as induced by changes in the drill-pipe torque, is detected by the load-sensing means which in turn generates a function representative of such force changes which is received by a display means such as a recorder. The display means responds to this function to present a readout of the torque variations in the drill pipe.

More particularly, and with further reference to FIGURE 1, the rotary-table housing 4 and prime mover 17 are secured to the base means 34 by means of locking elements 40–43 which may take the form of bolts 40a–43a and mounting flanges 40b–43b. The bolts may extend through the mounting flanges of their respective units to the underside of the base means where they are secured by nuts or other suitable fastening means. One or more of the locking elements 40–43 are provided with load-sensing means as described above. While such means may measure shear stress in the locking element, it usually will be preferred to position the locking element such that it is stressed predominantly in tension or compression in response to the force reaction to the drill-pipe torque. The force reaction produced on the prime mover 17 is predominantly rotational in a direction counter to the rotation of the shaft 14 and it is therefore preferred to measure the stress changes in a prime-mover locking element which is offset from the axis of the shaft 14 and has a component normal to such axis. Thus, as shown in FIGURE 1, the locking element 43 may be provided with a load-sensing device such that compressive or tensile force changes in the locking element, due to the tendency of the prime mover 17 to rotate about the drive shaft, are measured. The load-sensing device is connected via a suitable signal channel, indicated by broken line 45, to a display means 47 which suitably may take the form of a strip-chart recorder which records drill-pipe torque variations as a function of time.

Figure 2:
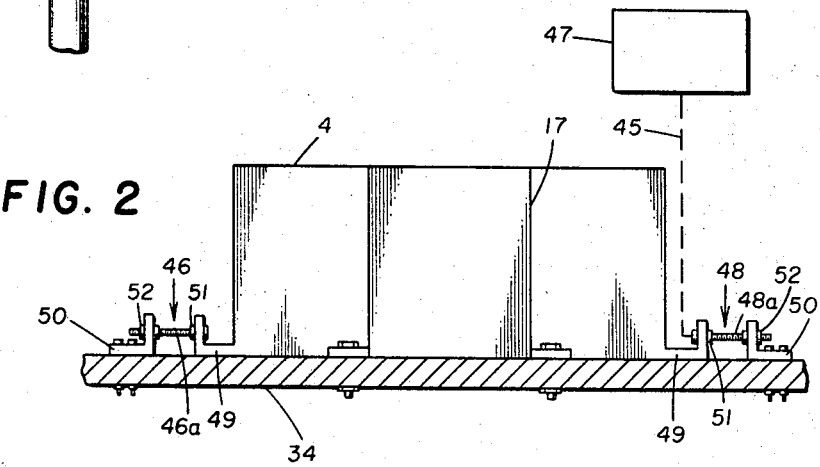
FIGURE 2 is an illustration showing another form of the invention.

It is to be recognized that housing locking elements such as those indicated by reference numerals 40 and 41 may be provided with load-sensing means. However, since the stress produced in elements 40 and 41 due to the force reaction on the rotary-table housing 4 primarily is in shear, it is preferred in measuring the force reaction on the housing 4 to provide locking elements which are stressed primarily in compression or tension in response to such force reaction. Such an orientation of housing locking elements is shown in FIGURE 2. More particularly, and with reference to FIGURE 2, there is shown an end elevation of a system similar to that shown in FIGURE 1 and in which like elements are indicated by the same reference numerals as used in FIGURE 1. As shown in FIGURE 2, the rotary-table housing 4 is secured to the base means 34 by means of locking elements 46 and 48 which provide a lateral, e.g., horizontal, connection between the housing and the base means. Locking elements 46 and 48 may take the form of bolts 46a and 48a which extend through L-flanges, such as shown at 49 and 50, and are secured to such flanges by spacing nuts 51 and outer nuts 52 in order that the lateral reaction force exerted on housing 4 will produce either a compressive or tensile stress in the bolts. For example, where drive shaft 14 rotates in a clockwise direction as described above, the reaction force produced in the rotary-table housing 4 will produce a compressive stress in bolt 48a and a tensile stress in bolt 46a. One or more of the rotary-table housing locking elements 46 and 48 may be provided with suitable load-sensing means. For example, bolt 48a may comprise a load-sensing device which, as shown in FIGURE 2, is connected to a recorder 47 by means of the signal channel indicated by broken line 45. Locking element 46 also may be provided with load-sensing means. With regard to element 46, it is to be recognized that spacing nuts 51 may be dispensed with where, as in the example given above, the reaction force on housing 4 produces a tensile stress in the bolt 46a. For example, flanges 49 and 50 may be connected to one another in an abutting relationship by bolt 46a.

Figure 3:
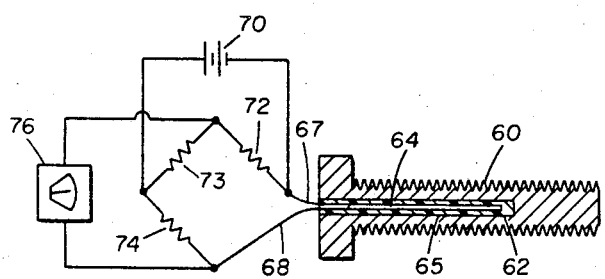
FIGURE 3 is an illustration, partly in section, showing one form of stress element provided with a load-sensing means and associated measuring and recording circuitry.

With reference to FIGURE 3, there is shown one form of locking element and load-sensing means along with its associated circuitry for supplying a suitable signal to the display means. The locking element comprises a bolt 60 having a passage 62 therein. A strain gauge 64 is disposed within the passage and bonded to the bolt by any suitable means, such as by an adhesive material 65. The strain gauge 64 preferably is of the resistance type and is connected through electrical leads 67 and 68 to a conventional Wheatstone-bridge measuring circuit. The measuring circuit includes a suitable source of D.C. power, such as a battery 70, and resistance elements 72, 73, and 74, which may take the form of "dummy" strain gauges in order to provide for temperature compensation in the measuring circuit. A recorder 76, which may comprise a galvanometer, is connected to the measuring circuit at terminals between strain gauges 72 and 73 and strain gauges 64 and 74, respectively. Thus, the recorder 76 is responsive to changes in current flow therethrough as caused by force changes in the bolt 60 sensed by strain gauge 64. For example, if the bridge circuit is balanced at zero stress in bolt 60, tensile or compressive stress in the bolt will result in current flow through the recorder 76, as will be understood by those skilled in the art.

While the load-sensing means utilized in the invention preferably are strain gauges of the electrical resistance type, it will be recognized that such means may take other forms. For example, the load-sensing means may take the form of inductance or capacitance strain gauges.

Having described specific embodiments of the instant invention, it will be understood that further modifications thereof may be suggested to those skilled in the art,

What is claimed is:
1. In a rotary drilling system adapted for the measurement of drill-pipe torque, the combination comprising:
   a rotary table housing,
   a rotary table journaled in said housing for rotational movement relative thereto about a longitudinal axis, said rotary table having a longitudinal opening therethrough adapted to receive a drill pipe in a slidable torque-applying relationship,
   a prime mover,
   a drive shaft journaled in said housing and extending laterally therethrough to said prime mover,
   bidirectional transmission means interconnecting said drive shaft and said table for transmitting rotational movement of said drive shaft to said table,
   base means forming a foundation for said housing and said prime mover,
   a plurality of locking means fixedly securing said housing and said prime mover to said base means, some of said locking means including load-sensing means for generating a function representative of a change in the force exerted on said locking means induced by a change in drill-pipe torque, and
   display means responsive to said function for presenting a representative characteristic of said function.

2. The system of claim 1 wherein:
   said locking means including said load-sensing means is interconnected between said housing and said base means.

3. The system of claim 2 wherein:
   said locking means including said load-sensing means provides a lateral connection between said housing and said base means.

4. The system of claim 3 wherein:
   said load-sensing means comprises a strain gauge bonded to said locking means.

5. The system of claim 1 wherein:
   said locking means including said load-sensing means is interconnected between said prime mover and said base means.

6. The system of claim 5 wherein:
   said locking means including said load-sensing means provides a longitudinal connection between said prime mover and said base means which is laterally offset from the axis of said drive shaft.

7. The system of claim 6 wherein:
   said load-sensing means comprises a strain gauge bonded to said locking means.

References Cited

UNITED STATES PATENTS

| | | | |
|---|---|---|---|
| 1,859,814 | 5/1932 | Wyckoff | 73—136 XR |
| 2,019,755 | 11/1935 | Zerbe et al. | 73—136 |
| 2,873,341 | 2/1959 | Kutsay | 73—88.5 XR |
| 3,173,292 | 3/1965 | Diehl et al. | 73—136 |
| 3,279,244 | 10/1966 | Emmerling | 73—136 |

OTHER REFERENCES

German printed application, 1,063,830, August 1959.

RICHARD C. QUEISSER, *Primary Examiner.*

C. A. RUEHL, *Assistant Examiner.*

U.S. Cl. X.R.

73—88.5